(12) United States Patent
Fossum et al.

(10) Patent No.: US 6,194,696 B1
(45) Date of Patent: Feb. 27, 2001

(54) ACTIVE PIXEL SENSOR WITH CURRENT MODE READOUT

(75) Inventors: Eric R. Fossum, La Crescenta; Alexander Krymski, Montrose; Barmak Mansoorian, Los Angeles, all of CA (US)

(73) Assignee: Photobit Corporation, Pasadena, CA (US)

(*) Notice: Subject to any disclaimer, the term of this patent is extended or adjusted under 35 U.S.C. 154(b) by 0 days.

(21) Appl. No.: 09/265,936

(22) Filed: Mar. 10, 1999

Related U.S. Application Data

(60) Provisional application No. 60/077,603, filed on Mar. 10, 1998.

(51) Int. Cl.[7] .............................. H01L 27/00; H04N 3/14
(52) U.S. Cl. ...................... 250/208.1; 348/294; 348/300; 348/308; 348/309
(58) Field of Search .................. 250/208.1; 348/294, 348/300, 301, 302, 308, 241, 250, 303, 304, 307, 309, 310, 315

(56) References Cited

U.S. PATENT DOCUMENTS

| | | | |
|---|---|---|---|
| 5,097,305 | * 3/1992 | Mead et al. | 257/292 |
| 5,324,958 | * 6/1994 | Mead et al. | 257/291 |
| 5,410,348 | * 4/1995 | Hamasaki | 348/296 |
| 5,436,442 | * 7/1995 | Michon et al. | 250/208.1 |
| 5,512,750 | * 4/1996 | Yanka et al. | 250/338.4 |
| 5,793,322 | * 8/1998 | Fossum et al. | 341/161 |
| 5,841,126 | * 11/1998 | Fossum et al. | 250/208.1 |

OTHER PUBLICATIONS

Krymski, Charge–Domain Analog Readout for and Image Sensor, Sep. 16, 1999, PCT WO 99/46929.*

* cited by examiner

*Primary Examiner*—Ricky Mack
(74) *Attorney, Agent, or Firm*—Fish & Richardson P.C.

(57) ABSTRACT

A current mode device for an active pixel sensor includes a voltage to current converter which includes an operation that occurs inside a source follower. The device operates to draw no current while the current is incoming. The device uses two stages of double sampling—one before the current-mode op amp and one after.

38 Claims, 3 Drawing Sheets

ACTIVE PIXEL SENSOR WITH CURRENT MODE READOUT

CROSS REFERENCE TO RELATED APPLICATIONS

This application claims the benefit of U.S. Provisional application Ser. No. 60/077,603, filed on Mar. 10, 1998, which is incorporated herein by reference.

BACKGROUND

Active pixel sensors often are arranged in arrays of pixels. Each pixel represents one part of the image. The pixels are read out in groups, e.g., one column at a time. It is desirable that these columns be read out at high speed. It is also desirable that the active pixel sensors have as much resolution as possible. This requires a larger array—that means a larger number of columns and a larger number of elements in the columns. Each device in each column is in parallel with a switch controlling when the device is turned on. Therefore, adding more devices puts more devices in parallel.

An exemplary device is shown in FIG. 1. Each column 100 may have a large number of devices in the column. The source follower 102 drives the entire column, and hence drives the entire analog bus capacitance of the column. A column select switch 104 selects the column. A larger column requires a more powerful column select switch and a more powerful column source follower in order to drive the entire analog bus capacitance. The more powerful switch typically requires a larger transistor, with a longer channel. This itself makes a higher total bus capacitance, and makes it even harder to drive the bus. The stray capacitance 112 of the bus therefore increases. Therefore, the transistor size increases, causes the capacitance to increase, and therefore to require an even larger transistor to drive the capacitance. Eventually the system reaches a point of diminishing returns.

SUMMARY OF THE INVENTION

The present system describes an alternative technique which allows certain of these issues to be obviated.

A first technique operates the system in a current mode.

According to a preferred mode, the current mode readout allows the entire sensor output to keep different parts of the readout bus at virtual zero potential, or at constant potential, so that the stray capacitance does not require a charge.

Accordingly, the system of the present disclosure produces a number of advantages which are described in the following

BRIEF DESCRIPTION OF THE DRAWINGS

These and other aspects of the drawings will now be described in reference to the attached drawings in which.

DESCRIPTION OF THE PREFERRED EMBODIMENTS

Figure 2:
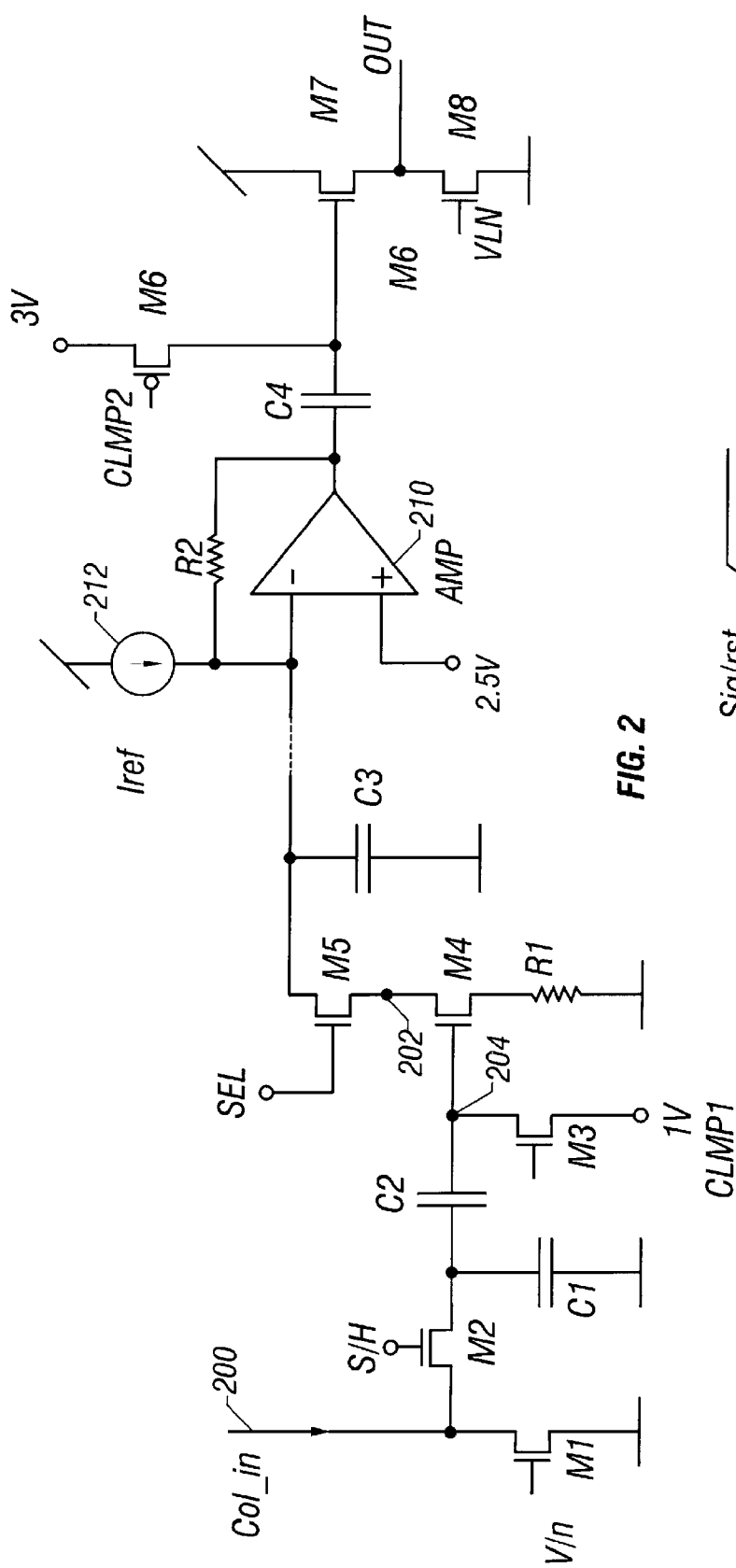
FIG. 2 shows a preferred mode which operates in current mode with virtual zero potential on the bus.
Figure 3:
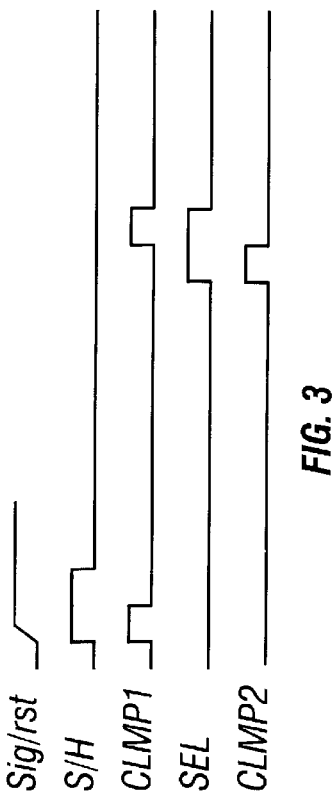
FIG. 3 shows a timing diagram of the device.

FIG. 2 shows a schematic for a current mode readout chain of the preferred mode. A simplified timing diagram is shown in FIG. 3.

All pixels in a column are connected in parallel with switching circuits controlling which of the pixels of the column is output at any one time. The signal from each selected pixel arrives on the column input 200. The signal is typically a negative charge amount that subtracts from the high level reset. A correlated double sampling operation is carried out as described herein. The following describes the operation for each one pixel.

A first source follower M3 clamps to a reference voltage of 1 volt during the time that the pixel signal is active. This clamp ends when the signal is reset. The sample and hold transistor M2 is maintained on during that time, by the S/H voltage that drives the gate of the S/H transistor M2. The signal is passed while the S/H is high as shown by the timing chart of FIG. 3. While that voltage is high, the charge-induced voltage passes through the sample and hold transistor, and is accumulated by the capacitors C1/C2. The capacitor is connected from S/H node to ground and the second capacitor C2 is connected in series with S/H.

The clamping value CLMP1 that is applied to the source of the transistor M3 is turned off. The reset operation begins at this time.

The outputs are connected to capacitors C1, C2 which carry out a correlated double sampling operation between the output voltages that are output at the different times. The first output voltage is the level of the reset. The second output voltage is the level of the photocharge induced signal added to the reference voltage (here, 1 V). This difference is a level that compensates for biases of the circuit elements, fixed pattern noise, and KTC noise, providing an output equal to a pure reset-signal+1 v. This signal is applied to the gate of the source follower M4.

M4 forms a voltage to current converting column source follower with an input gate, and two output legs. One of the output legs, e.g., the drain, forms an output node 202. The other leg, e.g. the source, is connected to a resistor. This, thereby provides good linearity of voltage to current conversion. A current that passes through the resistor R1 is proportional to its voltage. The source follower M4 hence converts the voltage driving its gate 204 to a current at its drain 202.

The output node 202 of the source follower, e.g. the drain, is connected to a column select switch. When the column is not selected, this switch is maintained "off". No current flows in the source follower during this time.

Current only flows once the column is selected. This preferably occurs after the end of the photoperiod. The column is selected by driving the column select transistor M5, bringing the SEL line to active high as shown in FIG. 3. At this time, current proportional to the difference of the first correlated double sampling result (reset level minus signal plus 1 volt reference) minus (M4 threshold) is applied to the inverting amplifier stage which includes op amp 210 and feedback resistor R2. The capacitor shown as C3 represents the stray capacitance of that bus. The path however, remains at constant voltage by the op amp 210, so there is no charging across the capacitance. This bus, however, is applied to the op amp's high impedance input.

After this voltage is sampled, and while the column is still selected, the drive to the gate of the clamp transistor M3, CLMP1, is turned on again. This provides a reference level for the second double sampling. This second reference level is proportional to the reference minus the M4 threshold ($M4_T$).

The op amp 210 produces an output based on the inputs which are received. At the first time, the output, $O_{T1}$ equals (reset—signal +reference—M4$_T$). At the second time, the time of reference only, the output O$_{T2}$ equals (reference—M4$_T$). The net difference between these two signals equals the incoming signal voltage, minus reset voltage, hence a level that is completely corrected for thresholds and reset levels. This pure level is recovered by correlated double sampling across capacitor C4. This signal is buffered by the source followers M7, M8, and provided as the active pixel sensor output output.

The actual correlated double sampling is carried out inside the column readout without separate buffers.

The op amp 210 is preferably a transimpedance op amp which uses a current pump I$_{ref}$ 220 that biases the op amp to a desired operation point, to extend the dynamic range of the signals. The value Iref is chosen to be the average current that passes through the column source follower. One embodiment therefore provides Iref as a variable signal which can be changed in order to bias the op amp to the proper level to provide improved dynamic range.

The second correlated double sampling is carried out by C4 and M6 which provides the difference between the signal and the reference, and removes any offset of the op amp. The output driver is also a source follower.

This circuit is well suited for n$^+$-p photodiode-type active pixel sensors. In that preferred mode, the signal coming from the pixel is a low signal, followed by a high reset. During the time of the signal, the input of the source follower is clamped to the reference voltage, e.g., 1 volt. Just before the pixel reset, the clamp MOSFET M3 is turned off. The pure difference of the reset minus signal plus the reference therefore appears at the input (gate) to the source follower M4. This value is maintained until the column is read out, and during this time no current flows since the switch is off. The column is selected to turn on M5. At that time, a current proportional to the difference signal (reset minus signal plus reference minus M4 threshold) is read out using the op amp 210. Then, the clamp transistor M3 is activated again. The reference current, proportional to reference minus M4 threshold, is read. The net of signal minus reset is recovered by second correlated double sampling across capacitor C4. This voltage is buffered and forms the APS output.

Figure 4:
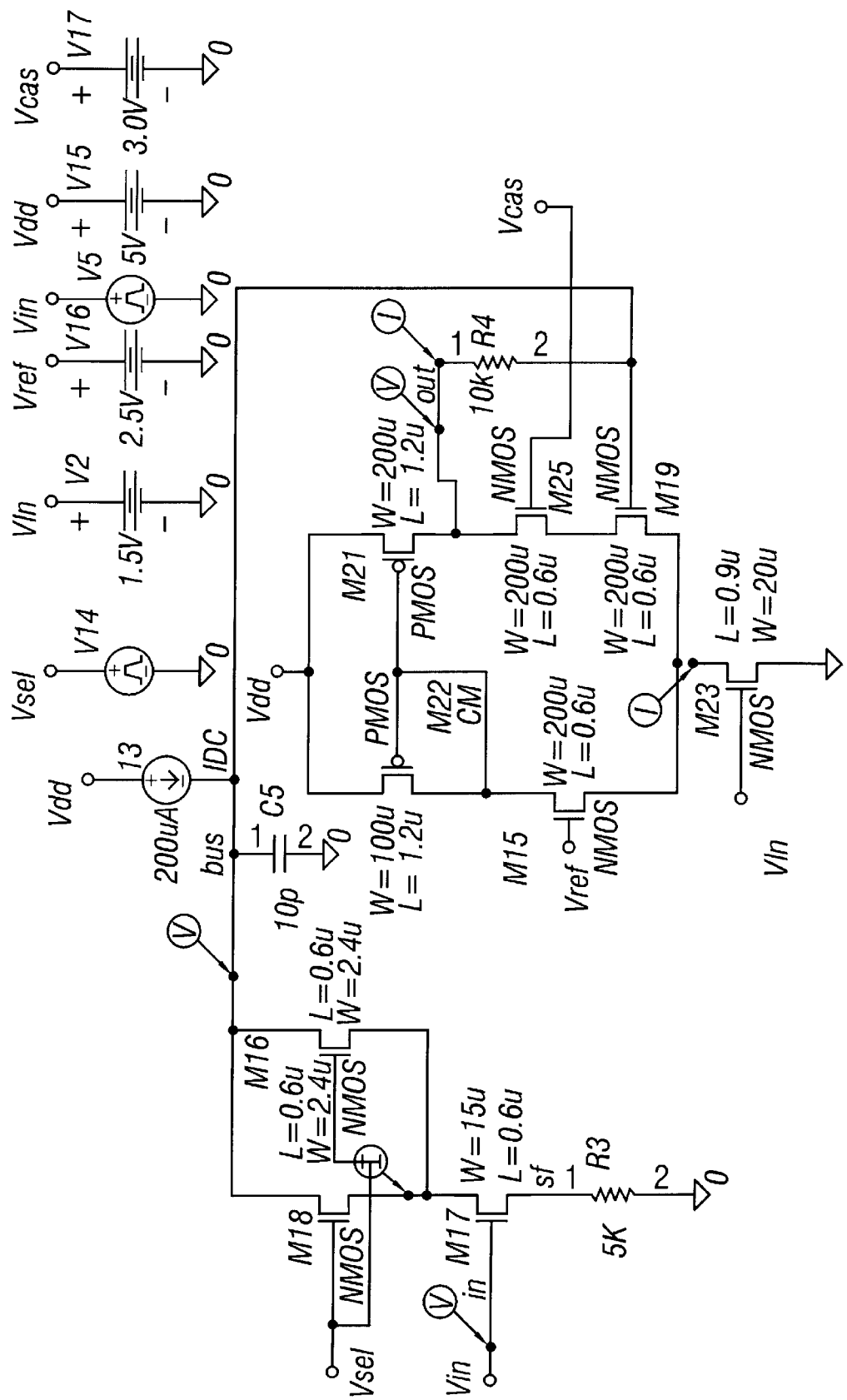
FIG. 4 shows a schematic of the detailed implementation.

FIG. 4 shows a schematic diagram showing further details of the implementation described above.

Figure 1:
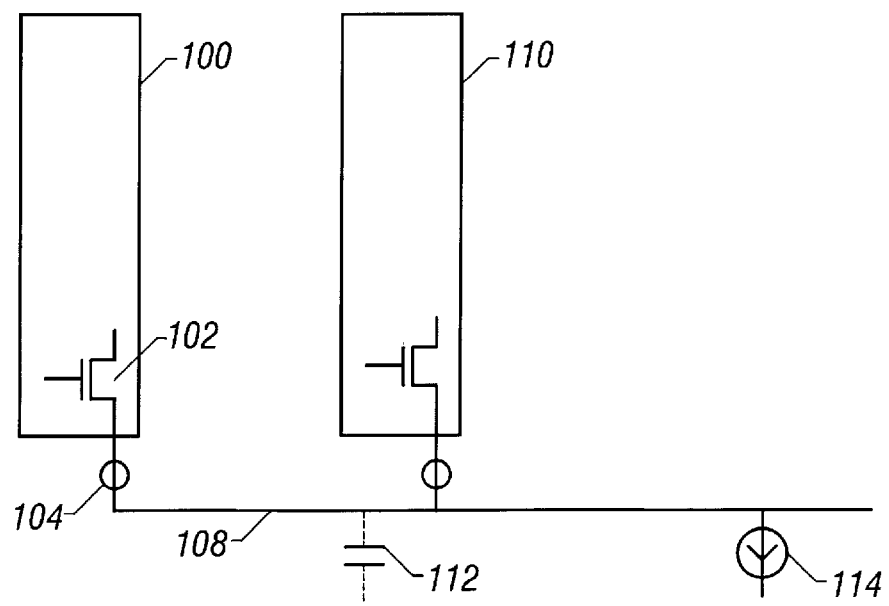
FIG. 1 shows a voltage mode device.
Figure 5:
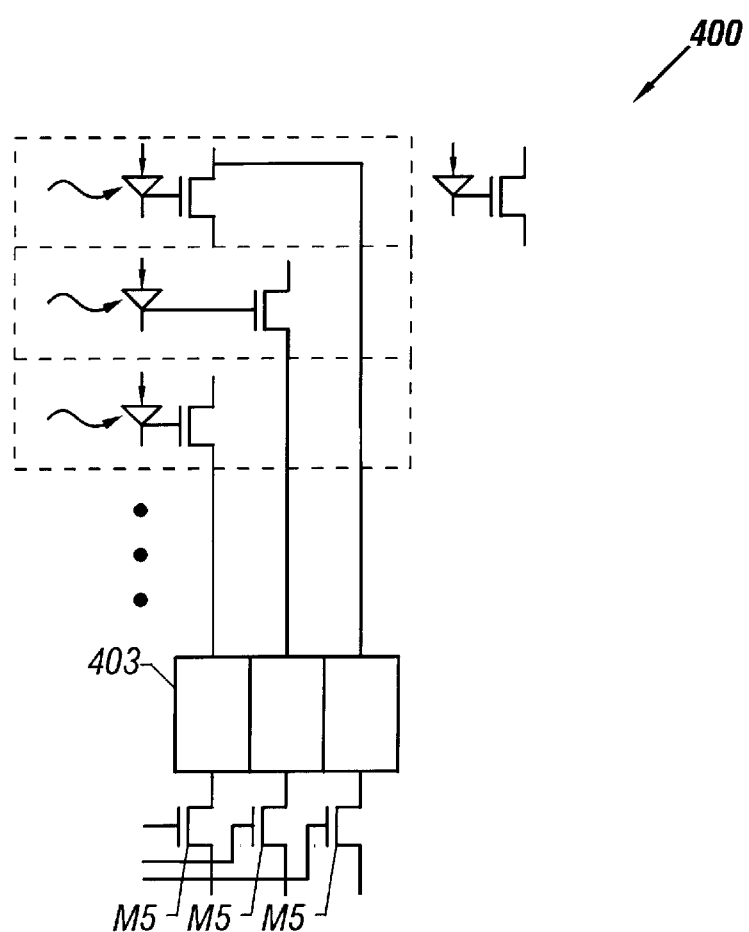
FIG. 5 shows a schematic of the device in the preferred application in an active pixel sensor.

FIG. 5 shows the preferred embodiment used in a photodiode pixel. A plurality of photodiode pixels, each having a photodiode as a photoreceptor, and at least one buffer in the pixel. The pixels are placed in an array 400. Each element is connected to the input circuit 403, e.g. the first correlated double sampling portion of FIG. 2. Each column is sequentially selected by selecting the corresponding transistor M5. Only three M5 transistors are shown for two different columns, but it should be understood that a typical number of columns might be between 256 and 1024 although that number certainly is not limiting. The large number of columns produces a high capacitance, but the capacitance C3 becomes effectively irrelevant since no current flows until the M5's are initiated.

Although only a few embodiments have been described in detail above, other embodiments are contemplated by the inventor and are intended to be encompassed within the following claims. In addition, other modifications are contemplated and are also intended to be covered. For instance, although the embodiment describes a photodiode pixels, other photoreceptors could be used; including a photogate, a pinned photodiode, or any other kind of photoreceptor.

For example, although FIG. 5 shows the circuit as being outside the pixel, in fact the circuit could be in the pixel.

What is claimed is:

1. An image sensor device, comprising:
   a plurality of image sensor elements, each element detecting a pixel of an overall image, said image sensor elements arranged in groups such that a group of said pixels can be output at one time to produce first pixel outputs;
   a first circuit element, which changes said first pixel outputs to a current that is indicative of the first pixel output and adjusts said current to remove at least one offset of associated circuitry used in obtaining the first pixel output, to produce a first corrected pixel output; and
   a common bus, selectively connected to a plurality of said pixels; and
   a second circuit element which prevents current from flowing during at least a portion of a time in which said pixel outputs are being obtained.

2. A device as in claim 1, further comprising an operational amplifier, with a high impedance current mode input maintained at a substantially constant voltage, connected to said common bus.

3. A device as in claim 2, further comprising a current source, feeding a bias current to one input of said operational amplifier, said bias current selected to correspond to an average current flow.

4. A device as in claim 1, wherein said second circuit element is a select transistor, which turns on to select one of a plurality of groups to be connected to said bus at any one time.

5. A device as in claim 4, further comprising a second correlated double sampling element, which removes at least one additional offset other than said at least one offset.

6. A device as in claim 5, wherein said at least one offset includes at least signal minus reset, and said at least one additional offset includes at least an offset of said transistor.

7. A device as in claim 1, wherein said first circuit element comprises a source follower with a gate connected to receive an input voltage, a first output leg having a resistor connected to ground and a second output leg producing an output current indicative of the input voltage.

8. A device as in claim 1, wherein said pixels are arranged in an array, and said groups are columns of the array.

9. An image sensor system, comprising:
   an image sensor element which produces an image sensor output indicative of incoming light;
   a converter, connected to receive said image sensor output, said converter including a transistor having an input connected to receive said image sensor output, an output leg having a resistor connected to produce a current flow proportional to said voltage, and another output voltage producing a current proportional to said voltage, thereby producing an output current proportional to said voltage.

10. A system as in claim 9, wherein said converter is a source follower, further comprising a group select switch, coupled to the output of the source follower, and turning on to enable current flow therethrough.

11. A system as in claim 9, further comprising a plurality of said converters, each connected to a separate image sensor element, and each having a group select switch, all of said group select switches of all of said converters being connected together at one end to form a bus.

12. A system as in claim 11, further comprising a current mode operational amplifier, connected to said bus.

13. A system as in claim 12, further comprising a current source, connected to said operational amplifier, and biasing the operational amplifier to a specified operation point which enhances dynamic range of the signals.

14. An active pixel sensor device, comprising:
   a plurality of pixel elements, each pixel element including a photoreceptor and at least one buffer, and producing an output indicating a value representing an amount of charge accumulated by the photoreceptor; and
   a sensing circuit, connected to receive said signal, and operating such that no current flows during at least a portion of a time when charge is being read out from said photoreceptor.

15. A device as in claim 14, further comprising a correlated double sampling circuit, using a capacitor element to determine a difference between signal level and reset level of said photoreceptor.

16. A device as in claim 15, wherein said converter device comprises a source follower, receiving said value at its input, and a second electronic switch, in series with an output leg of said source follower, selectively actuated such that no current flows through said source follower until said second electronic switch is actuated.

17. A device as in claim 16, further comprising a controller, controlling a select signal to said second electronic switch, and controlling a time of acquiring said signal, said select signal provided after a time of acquiring said signal.

18. A device as in claim 14, further comprising a sample and hold switch, selectively actuated to allow a signal from an associated photoreceptor to pass.

19. A device as in claim 18, further comprising a source follower, which does not conduct current at its gate until actuated and a selective actuator, connected to an output leg of said source follower, said selective actuator controlled to conduct during a different time than a time of conduction of said sample and hold circuit.

20. A device as in claim 14, wherein said sensing circuit includes a buffer circuit, receiving said signal at its input, and outputting said signal to its output.

21. A device as in claim 14, wherein said sensing circuit includes a source follower which converts a voltage input to a current output.

22. A device as in claim 21, wherein said source follower includes a transistor, receiving said voltage at its input gate, and including a resistor, said transistor having an output leg connected to ground via said resistor.

23. A device as in claim 14, further comprising a first correlated double sampling circuit which removes offsets of the transistors thereby providing an output proportional to signal minus reset.

24. A device as in claim 23, further comprising a current mode amplifier device, receiving an output from said first correlated double sampling circuit.

25. A device as in claim 24, further comprising a second correlated double sampling circuit, coupled to an output of said current mode amplifier device, producing an output which compensates for offsets of said current mode amplifier device.

26. A device as in claim 25, wherein said current mode amplifier device is an operational amplifier.

27. A method of operating an image sensor, comprising:
   attaching a plurality of image sensor outputs to a common bus;
   driving said outputs into a charge storage device, which stores a signal indicative of the charge from said image sensor outputs, during a time when no current is flowing; and
   after storing the charge, allowing current to flow, to thereby obtain an output indicative of said image sensor outputs.

28. A method as in claim 27, further comprising carrying out a first correlated double sampling on the input pixel information, to remove buffer offsets therefrom, and to provide a pure output indicative of signal minus reset.

29. A method as in claim 28, further comprising, when current flows, converting the first correlated double sampling signal to a current.

30. A method as in claim 28, further comprising amplifying the current indicative of the first correlated double sampling signal.

31. A method as in claim 29, further comprising amplifying the first correlated double sampling signal.

32. A method as in claim 30, further comprising carrying out a second correlated double sampling, to remove offsets caused by said amplifying.

33. A method as in claim 31, further comprising carrying out a second correlated double sampling in a current mode, to remove offsets caused by said amplifying.

34. A method as in claim 27, further comprising
   converting, when current flows, the output to a current; and
   amplifying said current to produce an amplified current output.

35. A method as in claim 34, further comprising converting said amplified current back to a voltage to output a voltage output signal.

36. A method as in claim 27, further comprising biasing the current mode device to an amount of an average dynamic range of the signals.

37. A method as in claim 28, wherein said first correlated double sampling by using two capacitors connected to a node receiving said signal, and wherein a first of said capacitors is connected to ground, and a second of said capacitors is connected in series with said node.

38. A double sampling pixel sensor device, comprising:
   a plurality of pixel elements producing an output indicating a value representing an amount of charge accumulated by the photoreceptor at a signal node;
   a first double sampling element, including two capacitors connected to said signal node, one connected to ground, and a difference between signal and reset levels as a first double sampled result;
   a clamp circuit, connected to said second node, and selectively producing a reference voltage on said second node;
   a buffer circuit, passing said first double sampled result;
   a second double sampling element, connected to an output of said clamp circuit, and operating to remove at least said reference voltage from said first double sampled result, and to remove at least one offset from said buffer circuit;
   a sensing circuit, connected to receive said signal, and operating such that no current flows during a least a portion of a time when charge is being read out from said photoreceptor.

* * * * *